United States Patent [19]

Faurholtz

[11] 4,398,096

[45] Aug. 9, 1983

[54] AERO ELECTRO TURBINE

[76] Inventor: Einar Faurholtz, 3 Sims Ave., Vallejo, Calif. 94590

[21] Appl. No.: 284,601

[22] Filed: Jul. 20, 1981

[51] Int. Cl.³ .............................. F03D 1/02; F03D 1/04
[52] U.S. Cl. .................................. 290/55; 415/2 R; 415/3; 415/DIG. 7
[58] Field of Search .................... 415/2, 3, 4, DIG. 7; 290/44, 55

[56] References Cited

U.S. PATENT DOCUMENTS

| | | |
|---|---|---|
| 1,315,595 | 9/1919 | Clark . |
| 1,568,718 | 1/1926 | Brattland ............................ 415/3 R |
| 1,783,669 | 12/1930 | Oliver . |
| 3,471,080 | 10/1968 | Gray ............................ 415/DIG. 7 |
| 4,116,581 | 9/1978 | Bolie ........................................ 415/2 |
| 4,127,356 | 11/1978 | Murphy .................................. 415/2 |
| 4,164,382 | 8/1979 | Mysels .................................... 415/2 |
| 4,191,505 | 3/1980 | Kaufman ................................ 415/2 |
| 4,224,527 | 9/1980 | Thompson ............................ 290/54 |

FOREIGN PATENT DOCUMENTS 970282  7/1975  Canada ................................ 415/2R

*Primary Examiner*—David Smith, Jr.
*Assistant Examiner*—Shelley Wade
*Attorney, Agent, or Firm*—Limbach, Limbach & Sutton

[57] ABSTRACT

A wind-powered electric generator using a concentrator structure and a focusing surface for focusing a wind stream onto a plurality of turbines, one of which is located within the concentrator structure, thereby providing for smaller structural size, as well as increased conversion efficiency.

6 Claims, 4 Drawing Figures

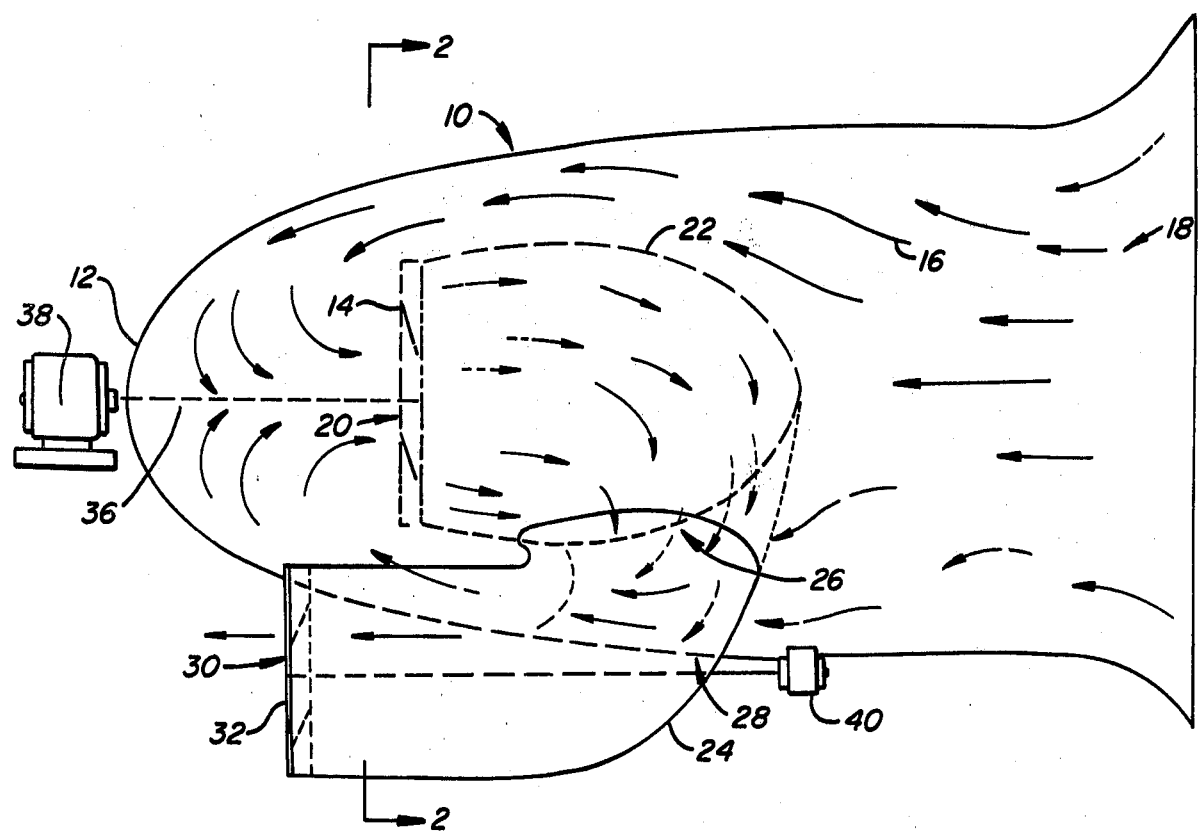
FIG._1.
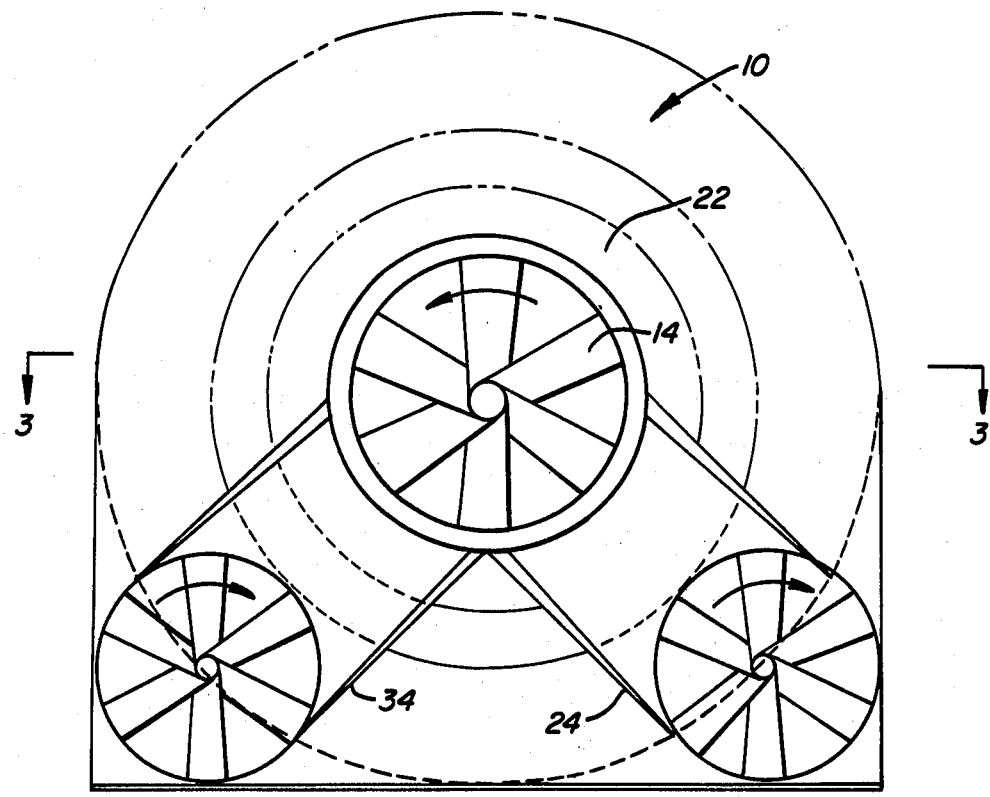
FIG._2.

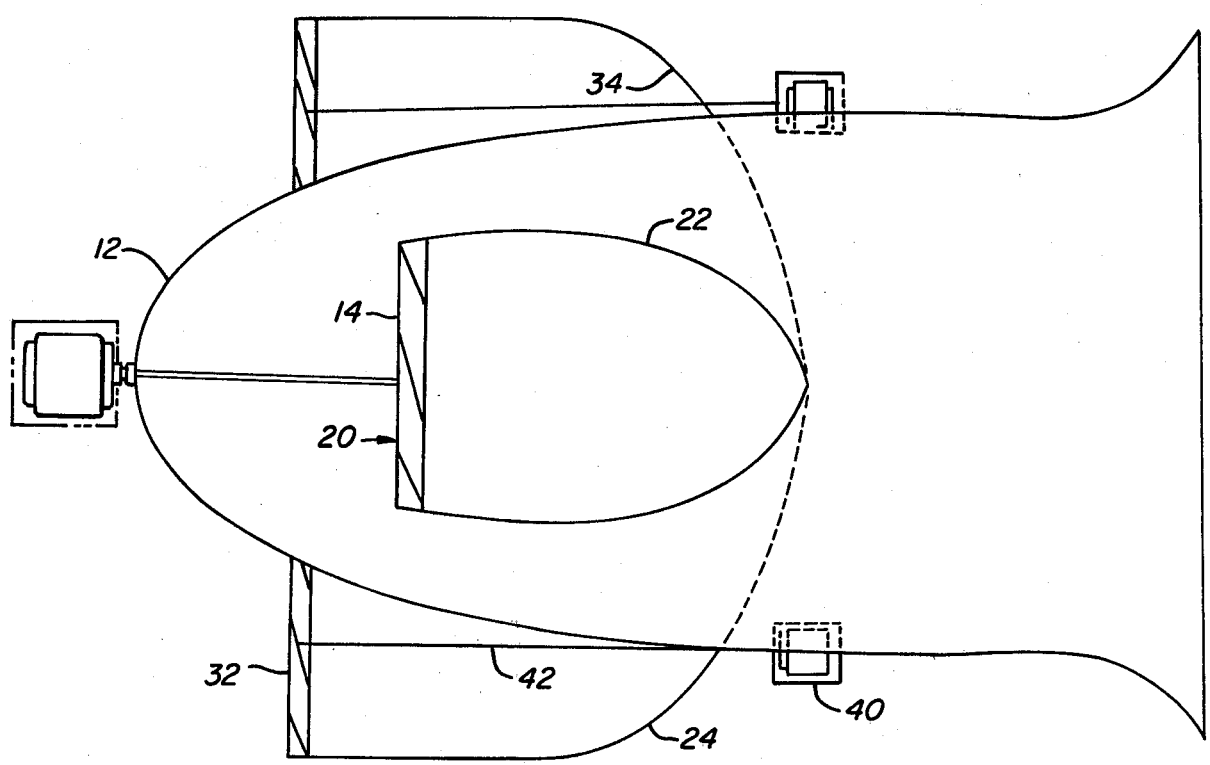
FIG._3.
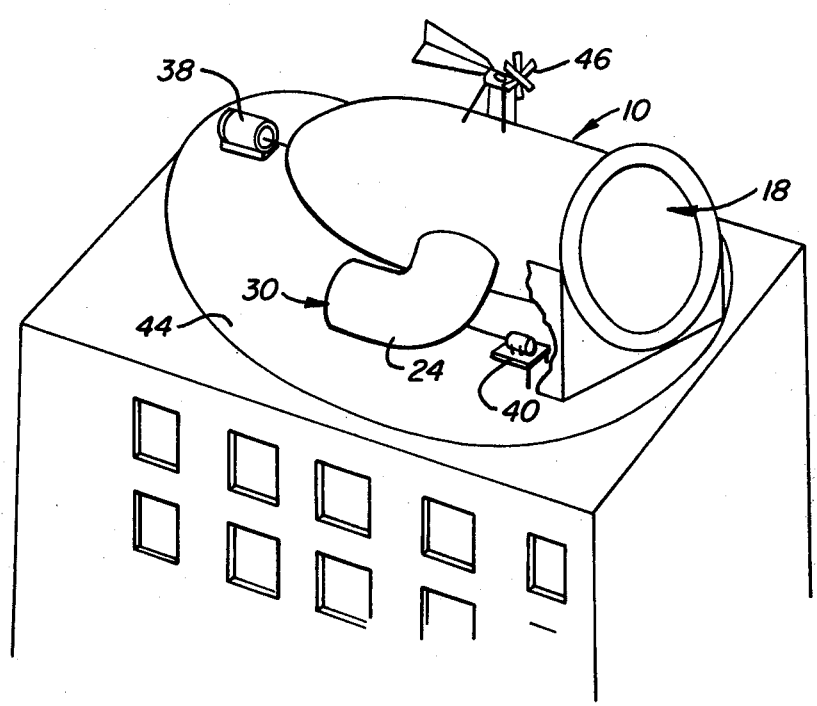
FIG._4.

AERO ELECTRO TURBINE

BACKGROUND OF THE INVENTION

The present invention relates generally to an apparatus for energy conversion and, in particular, to a wind-powered electrical generator.

In the past, the windmill has been the primary means for converting wind energy into useful work. It is notable that since the 14th Century when the windmill came into use, there has not been any significant intrinsic principal change in its construction. While the old watermill wheel has been transformed into the hydroelectric turbine, the windmill has remained the same, except that it has been built larger and at an increasingly prohibitive cost.

In recent years concentrating tubes have been used to gather the wind stream entering a large surface area and to direct such wind stream into a progressively narrowing passageway, thereby concentrating the force of the wind stream. Typical of such efforts are Murphy, U.S. Pat. No. 4,127,356 entitled "Wind Motor Machine" and D. R. Oliver, U.S. Pat. No. 1,783,669 entitled "Air Motor."

In Murphy, a horn-shaped structure is used to concentrate the incident wind stream which is thereafter directed to flow over an impeller. The impeller rotates a shaft which is coupled to an electric generator. In Oliver, a conically-shaped structure is used to concentrate the wind stream. The concentrated wind stream is directed into and through an elongated tube in which are mounted a number of turbines. These turbines are mounted on a shaft and coaxially with the tube. The shaft, in turn, is attached to an electric generator. In both Oliver and Murphy, the structures are mounted on a rotatable turntable so that the concentrating structures can be orientated into the wind stream flow.

Among the disadvantages associated with the above wind generator configurations are size and efficiency. In order to accommodate the multiple turbine blades and the flow-through design in Oliver, the tube which contained the blades and the shaft comprises at least 50% of the total length of the wind generator. In Murphy, the turbine wheel extends beyond the confines of the concentrator structure.

In Oliver, the electric generator is indirectly coupled to the shaft, as necessitated by the large size of the structure. This indirect coupling gives rise to the need for additonal belts and wheels in order that the coupling may be implemented. In Murphy, the turbine is contained partly within the concentrator structure and partly outside of the concentrator structure. As such, the turbine is used much like a water wheel, wherein a fraction of the available blade surface is used to convert the wind stream into rotational motion. As a result, the efficiency of the conversion is reduced and the minimum wind speed required for operation of the turbine is increased.

Another disadvantage is believed to exist in the Murphy and Oliver configurations; that is, a susceptibility to wind gusts. In both the design and operation of wind powered generators the variability of the wind is a significant factor. The turbines in each are directly exposed to the full force of the incident windstreams. Thus, the turbines should be capable of operation over a highly variable wind speed range, and the generators, which convert the rotational energy supplied by the turbines into electricity, should be capable of operating over a wide range of rotational velocities.

In order to permit operation over highly variable wind speeds, the efficiency of the generator is often sacrificed. Additionally, the above turbine and generator should be designed to withstand peak gusts, which can have velocities which are very large. This often results in the use of turbines and generators which are over-designed with respect to the average operating conditions of the wind powered installation.

In the present invention, a focusing surface is used in conjunction with a concentrator structure, thereby permitting the turbine to be included wholly within the concentrator structure, and acting to reduce the effects of wind gusts on the turbine and associated generators. This, in turn, results in size reduction, as well as increased conversion efficiency.

SUMMARY OF THE INVENTION

The foregoing and other problems of prior art wind generators are overcome by the present wind-powered generator comprising concentrator means for concentrating a fluid flow, a turbine housing positioned within the concentrator means, exhaust means to exhaust fluid flow from the turbine housing, turbines positioned within the turbine housing and the exhaust means for converting fluid flow into rotational motion, and generator means for converting the rotational motion into electrical energy.

The concentrator means have a flow chamber which defines a fluid flow path which directs the fluid onto a focusing surface. The focusing surface is located at the end of the flow chamber opposite the concentrator entrance. The focusing surface has a focus which is located within the flow chamber, and which is coincident with an inlet to the turbine housing. The turbine housing is shaped to have the open inlet for accepting the focused fluid flow and an opposite closed end the outer surface of which is shaped to assist in the concentration of the fluid flow through the flow chamber. A first turbine is positioned within the inlet to the turbine housing, and is coupled to an electric generator located outside of the concentrator structure. The exhaust means exhaust fluid flow from the turbine housing to the exterior of the concentrator structure. A second turbine is located within the exhaust means to extract energy from the exhaust flow. This second turbine is coupled to an electric generator which is located outside of the concentrator structure.

The use of the focusing surface in the present invention permits a reduction in size of the overall length of the wind-powered generator, as well as increases the efficiency of the channeling or the directing of the wind stream onto the turbines. The focusing surface is different from the channeling structures of the prior art in that the reflections of the wind stream off of the focusing surface are focused onto a specific area, whereas with the channeling structures, only the direction of the wind stream is changed.

Because no connecting tube is required for coupling the concentrator structure to the turbine, the overall length of the wind-powered generator can be shortened. In effect, the connecting structure in the present invention is contained within the concentrator structure. What's more, the shape of the turbine housing enhances the concentration of the wind stream and the focusing thereof by the focusing surface.

The focusing surface and concentrator combine to produce a wind speed averaging effect upon the incident wind stream. The cupping action of the concentrator and focusing surface produce a cushioning effect upon the incident windstream. As the windstream is focused into the turbine housing inlet by the focusing surface, higher speed gusts are reduced in velocity by a backpressure effect caused by the interaction of the focused windstream upon th incident windstream. As a result the windstream velocity as seen by the turbine is maintained at a more constant rate.

It is believed that the structures in Murphy and Oliver act to double the force of the incident wind stream whereas, in the present invention, the force is increased to a greater degree. In the present invention it is calculated that in a wind stream having a velocity of 15 miles per hour, the effective pressure at the turbine will be approximately 20 kg/m$^2$. Assuming a turbine surface area of approximately 20m$^2$, approximately 7 horsepower will be supplied to the generator. This in turn translates to approximately 10 K.W.H. of electricity from the first turbine, and a somewhat smaller amount of generated electricity from the second turbine.

In the present invention, the positioning of the turbines within the turbine housing and the exhaust means permit the simpler direct-coupling of the turbine means to the electric generators.

Accordingly, it is an object of the present invention to provide a fluid flow powered electric generator, wherein a focusing surface focuses concentrated fluid flow onto a turbine which is contained within a concentrator housing.

It is a further object of the present invention to provide a wind-powered electric generator, wherein a concentrator structure concentrates a wind stream and directs the wind stream onto a focusing surface which, in turn, focuses the wind stream onto a turbine, which is located within the concentrator structure.

It is another object of the present invention to provide a wind-powered generator, wherein a turbine is located within a concentrator structure, and further wherein a turbine housing is disposed about the turbine, the turbine housing structure having a shape which functions in conjunction with the concentrator structure to further concentrate the wind stream flow.

It is a still further object of the present invention to provide a wind-powered generator having small size, yet high efficiency.

It is still another object of the present invention to provide a wind-powered electric generator, wherein a concentrator structure gathers a wind stream and concentrates the wind stream wherein the wind stream is directed onto a parabolic focusing surface, and further wherein the focus of the parabolic focusing surface is incident upon a turbine which is located within the concentrator structure, and which is positioned within a turbine housing.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a simplified cross-sectional view of the present invention.

FIG. 2 is a cross-sectional view of the present invention taken along lines 2—2 of FIG. 1.

FIG. 3 is a cross-sectional view of the present invention taken along lines 3—3 of FIG. 2.

FIG. 4 is a perspective view of the present invention in one potential application.

DETAILED DESCRIPTION OF THE PREFERRED EMBODIMENT

Referring more particularly to FIG. 1, the general structure of the wind-powered generator will now be described. The concentrator 10 gathers a wind stream incident upon a predetermined area and concentrates that wind stream into a progressively smaller passageway, thereby increasing the velocity of the wind stream. In the present invention, the concentrator structure includes a focusing surface 12 which focuses the concentrated wind stream onto a turbine 14. The wind stream is indicated by arrows 16.

The focusing surface 12 is located at the end of the concentrator structure opposite the flared mouth 18 of the concentrator structure. In the preferred embodiment of the present invention, the flared mouth has the shape of a funnel, and the focusing surface 12 has a shape of a parabola. The concentrator structure between the flared mouth 18 and the focusing surface 12 has the shape of a cylinder, followed by an elipse cone.

The turbine 14 is positioned in the focus of the focusing surface 12 so that the focused wind stream incident upon the turbine 14 will cause the turbine 14 to rotate. The turbine 14 is also positioned within the inlet 20 of turbine housing 22. The turbine housing is shaped so that inlet 20 faces the focusing surface 12. The end opposite the inlet 20 is shaped to aid the wind stream concentrating function of the concentrator 10.

In the preferred embodiment of the present invention, the turbine housing is substantially ellipsoid in shape so that it has a major and a minor axis of rotation. The inlet 20 is positioned at one end of and coaxially with the major axis of rotation. The housing 22 is positioned so that the major axis of rotation lies along the fluid flow path. The end of the turbine housing opposite the inlet 20 being closed and ellipsoid in shape and similar in shape to the nose of an airplane thereby reduces drag in the flow of the wind stream over the housing 20 on its way to the focusing surface 12. The positioning of the housing 22 within the concentrated structure 10 creates a fluid flow path which is small with respect to the entrance 18 of the concentrator structure 10. This constriction in flow area coupled with the minimal drag produced by the shape of the housing 22, provide for high wind stream velocities with minimal drag-related losses.

The wind flow into the turbine housing 22 is permitted to exit the housing via exhaust tube 24. Exhaust tube 24 is coupled to housing 22 via exhaust port 26. The outer surface of the connection between exhaust tube 24 and housing 22 is shaped to present minimal resistance to the wind stream flow 16 through the concentrator 10. The exhaust tube 24 extends through the concentrator flow chamber and exits the concentrator 10 through concentrator coupling port 28, and thence to the exterior of the concentrator structure 10. The portion of the exhaust tube 24 which is located outside of the concentrator structure 10 has an outlet port 30 which is positioned so that the wind stream exiting through the port 30 exits in the same direction as the surrounding wind stream. A second turbine 32 is positioned within the outlet port 30 of the exhaust tube 24. The second turbine 32 is positioned so as to be orthogonal to the wind flow exiting the outlet port 30.

In the preferred embodiment of the present invention, a second exhaust tube 34 is connected to the turbine housing 22. This is illustrated in FIG. 2. In the preferred embodiment of the present invention, the exhaust tube 24 and 34 additionally serve to support the concentrator 10. The addition of a second exhaust tube increases the air flow through the turbine housing by reducing the back pressure present in the turbine housing 22 caused by restricted exhaust psasageway areas.

FIG. 3 illustrates the orientation of the concentrator 10, the focusing surface 12, the turbine housing 22, and the exhaust ports 24 and 34 with respect to each other.

In the present invention, the turbines are communicatively coupled to electric generators which are located outside the concentrator 10. In the preferred embodiment of the present invention, a shaft 36 extends from the first turbine 14 through the focusing surface 12 to a high-speed, high-torque electric generator 38. The second turbine 32 is coupled to a low-speed, low-torque electric generator 40 by shaft 42.

FIG. 4 illustrates one application of the present invention. A platform 44 is rotatably mounted to the top of a building, for example. The wind-powered generator is mounted onto the platform 44. A wind-direction stabilizer 46 is mounted to the condenser structure 10 to provide control for directing the condenser mount 18 into the wind direction. As the wind direction changes, the platform 44 is rotated accordingly.

In operation, the flared mouth 18 of the condenser structure 10 presents a large gathering-surface area to the incident wind stream 16. The portion of the concentrator 10 between the flared mouth 18 and the focusing structure 12 acts to concentrate the wind flow which, in turn, increases the velocity of the wind stream which is incident onto the focusing surface 12. The shape of the turbine housing 22 acts to enhance this concentration function without unduly dissipating the wind flow energy. The focusing surface 12 focuses the wind flow onto the turbine 14 which is positioned within the inlet 20 of the turbine housing 22. The wind stream flow across the turbine 14 causes the turbine to rotate. The turbine rotation is transferred via shaft 36 to the high-speed, high-torque electric generator 38. The wind stream which has passed through the first turbine 14 is reduced in velocity, and is permitted to exit the turbine housing 22 via exhaust port 26 and exhaust tube 24. This reduced flow of air is then directed onto the second turbine 32, which is thereby rotated to power a low-torque, low-speed electric generator 40. A result of the above configuration, the size of the wind-powered generator can be kept small, while maintaining a high efficiency of conversion from wind to electrical energy.

In one embodiment of the present invention, the mouth 18 of the concentrator 10 has a diameter of approximately 14 meters. The concentrator tapers in the manner of an ellipse cone, to a diameter of approximately 9 meters in the area of the turbine housing 22. The diameter of the turbine housing 22 at that point is approximately 5 meters. The length of the concentrator structure is approximately 20 meters. While a strong, easily formed metal is the preferred material for the concentrator 10, turbine housing 22 and exhaust structures 24 and 34, any strong, formable material should be satisfactory in the construction of the present invention.

The terms and expressions which have been employed here are used as terms of description, and not of limitation, and there is no intention, in the use of such terms and expressions, of excluding equivalents of the features shown and described, or portions thereof, it being recognized that various modifications are possible within the scope of the invention claimed.

What is claimed is:

1. A wind-powered generator comprising
concentrator means for concentrating and focusing a fluid flow, the concentrator means having a flow chamber which defines a fluid flow path, a flared mouth which is located at one end of the flow chamber, a focusing surface which is located at the opposite end of the flow chamber, and a coupling port, the focusing surface having a focus located within the flow chamber;
a turbine housing having an inlet and an exhaust port, the turbine housing being positioned within the flow chamber so that the inlet opens to the focusing surface focus, the focusing surface and the turbine housing inlet being positioned relative to one another so that the focusing surface receives the fluid flow from the fluid flow path of the flow chamber and focuses the fluid flow into the turbine housing inlet;
an exhaust tube, open at both ends, extending from the exhaust port and through the coupling port to the exterior of the concentrator, the exhaust tube being communicatively coupled to the exhaust port so that the fluid flowing into the inlet is exhausted from the turbine housing to the exterior of the concentrator;
a first turbine positioned in the inlet for rotation in response to fluid flowing into the inlet; and
generator means for converting rotational motion into electrical energy, the generator means being communicatively coupled to the first turbine so that the rotation of the turbine is converted into electrical energy.

2. The wind-powered generator as recited in claim 1 wherein the focusing surface is concave to the flow chamber and is parabolic in shape.

3. The wind-powered generator as recited in claim 1, wherein the turbine housing has a substantially ellipsoid shape, the housing having a major and a minor axis of rotation so that the inlet is positioned at one end and coaxially with the major axis, and further wherein the major axis lies along the fluid flow path.

4. The wind-powered generator as recited in claim 1 wherein the concentrator is mounted to a rotatable platform.

5. The wind-powered generator as recited in claim 1 further including
a second turbine positioned in the exhaust tube for rotation in response to the fluid flowing through the exhaust tube;
a first shaft for communicatively coupling the first turbine to the generator means, the first shaft extending from the first turbine and through the focusing surface; and
a second shaft for communicatively coupling the second turbine to the generator means, the second shaft extending from the second turbine and through the generator means.

6. The wind-powered generator as recited in claim 1 wherein the generator means comprise
a high-speed, high-torque electric generator; and
a low-speed, low-torque electric generator.

* * * * *